United States Patent
Umeda et al.

[11] Patent Number: 5,851,612
[45] Date of Patent: Dec. 22, 1998

[54] CONTAINER FORMED FROM COPOLYESTER COMPOSITION, COPOLYESTER COMPOSITION THEREFOR AND METHOD OF PRODUCING THE SAME

[75] Inventors: Masami Umeda; Kimihiko Sato, both of Matsuyama, Japan

[73] Assignee: Teijin Limited, Osaka, Japan

[21] Appl. No.: 998,387

[22] Filed: Dec. 24, 1997

[51] Int. Cl.⁶ .............................. B29D 22/00; C08K 3/02
[52] U.S. Cl. .................. 428/35.7; 528/275; 528/277; 528/280; 528/283; 528/286; 528/298; 528/302; 528/308; 528/308.6; 524/706; 524/710; 524/777; 524/783; 524/785; 524/788
[58] Field of Search .................... 528/275, 277, 528/280, 283, 286, 298, 302, 308, 308.6; 524/706, 710, 777, 783, 785, 788; 428/35.7

[56] References Cited

U.S. PATENT DOCUMENTS

| | | | |
|---|---|---|---|
| 4,604,453 | 8/1986 | Kuze et al. | 528/481 |
| 5,571,584 | 11/1996 | Yamamoto et al. | 428/35.7 |
| 5,714,570 | 2/1998 | Kim et al. | 528/279 |

FOREIGN PATENT DOCUMENTS

| | | |
|---|---|---|
| 3-43425 | 2/1991 | Japan . |
| 3-87237 | 4/1991 | Japan . |
| 3-122116 | 5/1991 | Japan . |
| 7-223623 | 8/1995 | Japan . |

*Primary Examiner*—Samuel A. Acquah
*Attorney, Agent, or Firm*—Sughrue, Mion, Zinn, Macpeak & Seas, PLLC

[57] ABSTRACT

A container formed from a copolyester composition which comprises a copolyester containing 80 to 95 mol % of terephthalic acid and 20 to 5 mol % of 2,6-naphthalenedicarboxylic acid as acid components and ethylene glycol as a glycol component, wherein catalyst metals of a calcium compound, magnesium compound and cobalt compound are contained in the copolyester in such amounts that satisfy all the following expressions (1) to (4) based on the total of the whole acid component of the polymer:

$0 < Ca \leq 35 \text{(mmol \%)}$      (1)

$0 < Mg \leq 80 \text{(mmol \%)}$      (2)

$40 \leq (Mg+Ca) \leq 90 \text{(mmol \%)}$      (3)

$0 \leq Co \leq 15 \text{(mmol \%)}$      (4).

The above polyester container is excellent in gas barrier property, ultraviolet light screening property, hot water resistance, hue and transparency, is not whitened and has a small content of aldehyde.

15 Claims, No Drawings

CONTAINER FORMED FROM COPOLYESTER COMPOSITION, COPOLYESTER COMPOSITION THEREFOR AND METHOD OF PRODUCING THE SAME

FIELD OF THE INVENTION

This invention relates to a container formed from copolyethylene terephthalate modified by a 2,6-naphthalenedicarboxylic acid component and to a series of technologies therefor. More specifically, it relates to a transparent polyester container which is satisfactory in gas barrier property and hue (colorlessness) and excellent in ultraviolet light screening property and to a series of technologies therefor.

PRIOR ART

Currently, polyethylene terephthalate (may be abbreviated as PET hereinafter) is widely used as a material for beverage bottles and packaging sheets. On the other hand, it is known that polyethylene-2,6-naphthalene dicarboxylate (may be abbreviated as PEN hereinafter) which is superior to PET in basic properties such as heat resistance, gas barrier properties, chemical resistance or the like is useful as a material for beverage bottles and packaging sheets. However, as PEN is much more expensive than PET and it is difficult to acquire acid components as a source material for PEN in large quantities, it is not widely used in spite of its excellent properties.

Meanwhile, there have been various proposals for a use as a mixture of PEN and PET and a copolymerization of PET with acid components of PEN as materials for a container such as a bottle.

That is, there has been proposed a technology for melt mixing PEN and PET together in a molding machine and injection molding the resulting mixture into a molded product such as a bottle (see, for example, JP-A 3-43425 (the term "JP-A" as used herein means a "publication of unexamined Japanese patent application")). In this technology, to make PEN and PET compatible with each other, both polymers must be subjected to an ester interchange reaction at a high temperature for a certain residence time. It is inevitable that formaldehyde (may be abbreviated as F.A. hereinafter) and acetoaldehyde (may be abbreviated as A.A. hereinafter) are by-produced as deteriorated products of the polymers because thermal decomposition of the polymers is expedited in a state where shear force is applied to the polymers in a molding machine (extruder) under melt heating. F.A. and A.A. exert unfavorable influences on the smell and taste of the contents of a container or package and hence, materials containing them beyond an acceptable amount cannot be used as a material for a food container or packaging sheet.

Since out of packaging materials, the state of a packaging container made from a material used for a bottle containing beverage such as juice or the like has a decisive influence on the commodity value in many cases, use of a packaging material excellent in hue and transparency is strongly desired. Although PEN can be obtained basically through a reaction which uses a catalyst system similar to that of PET, it is known that use of germanium dioxide as a polymerization catalyst is effective in obtaining a colorless material in particular.

Meanwhile, a technology for copolymerizing a 2,6-naphthalenedicarboxylic acid component with PET is disclosed by JP-A 7-223623. However, this co-PET is liable to have whitening by blow molding or the like at the time of molding a bottle more easily than PEN produced by an ester interchange (may be abbreviated as EI hereinafter) method and hence, a bottle having satisfactory transparency cannot be obtained. That is, JP-A 7-223623 discloses the use of organic acid calcium as an EI catalyst as a technology for obtaining a good colorless polymer. However, when organic acid calcium is solely used as an EI catalyst, deposited particles of large size are formed in large quantities in the polymer, thereby making it difficult to suppress whitening in the blow molding of a bottle.

When a manganese catalyst is used as an EI catalyst, formation of deposited particles due to the catalyst can be suppressed to some extent. However, compatibility of the manganese catalyst with a germanium compound used as a polymerization catalyst is poor and consequently, viscosity is reduced by the deterioration of a polymer during molding or large quantities of F.A. and A.A. are by-produced or stable molding becomes impossible to proceed. As a result, a polymer satisfactory for use in a container (bottle) cannot be obtained.

A titanium catalyst is known as a catalyst capable of suppressing the formation of deposited particles, but a polymer produced using this catalyst has a strong yellow tint and is not suitable as a polymer for a bottle. Although there is known a method for adjusting this yellow tint by adding a cobalt catalyst, the polymer becomes blackish when the yellow tint is suppressed, and hence, it is impossible to obtain a copolyester which is excellent in hue and transparency.

When organic acid calcium or organic acid magnesium is used as an EI catalyst, it is necessary for obtaining practical productivity to carry out an EI reaction by adding a predetermined amount of an organic acid zinc catalyst. In this case, deposited particles produced in the obtained polymer are smaller in quantity and size than deposited particles produced when an organic acid calcium catalyst is used. However, the polymer has whitening during blow molding and hence, it is difficult to obtain a bottle having satisfactory transparency.

PROBLEM TO BE SOLVED BY THE INVENTION

It is therefore a first object of the present invention to provide a polyester container that does not cause whitening by a blow molding.

It is a second object of the present invention to provide a polyester container having excellent gas barrier and ultraviolet light screening properties.

It is a third object of the present invention to provide a polyester container that is excellent in transparency and hue, i.e., is colorless.

It is fourth object of the present invention to provide a polyester container having small contents of F.A. and A.A.

It is another object of the present invention to provide a polyester composition for molding the above polyester container and a method of producing the polyester composition.

It is a still another object of the present invention to provide a series of technologies for providing a polyester container having the above properties economically advantageously.

MEANS FOR SOLVING THE PROBLEM

The inventors of the present invention have made studies and found that when a copolyester having ethylene terephthalate units as a main recurring unit and ethylene-2,6- naphthalene dicarboxylate as a copolymerizable unit is selected and further, specific amounts of specific catalyst components are used in combination, the formation of deposited products ascribed to the catalysts can be suppressed and crystallization-induced by the deposited products does not occur. Thus, the above objects can be attained.

According to the present invention, the objects of the present invention can be achieved by a container formed from a copolyester composition which comprises a copolyester containing 80 to 95 mol % of terephthalic acid and 20 to 5 mol % of 2,6-naphthalenedicarboxylic acid as acid components and ethylene glycol as a glycol component, wherein catalyst metal components are contained in the copolyester in such amounts that satisfy the following expressions (1) to (4) based on the total of the whole acid component:

$$0.1 < Ca \leq 35 \qquad (1)$$

$$0.1 < Mg \leq 80 \qquad (2)$$

$$40 \leq (Ca+Mg) \leq 90 \qquad (3)$$

$$0 \leq Co \leq 15 \qquad (4)$$

in which Ca, Mg and Co represent each an amount (mmol %), in terms of metal, of a calcium compound, a magnesium compound and a cobalt compound contained in the copolyester composition, based on the total of the whole acid component.

The present invention will be described in more detail hereinafter.

The copolyester constituting the container of the present invention comprises 80 to 95 mol % of terephthalic acid and 20 to 5 mol % of 2,6-naphthalenedicarboxylic acid as acid components and ethylene glycol as a glycol component. When the proportion of the 2,6-naphthalenedicarboxylic acid component is less than 5 mol %, the resulting polymer has inferior heat resistance and a container formed from this polymer is easily deformed and gets loose when a mouth portion of the container (bottle) is exposed to a hot water at 95° C. The gas barrier and ultraviolet light screening properties of the polymer are on the same level as those of homopolyethylene terephthalate (PET) and hence, the object of the present invention cannot be attained. On the other hand, when the proportion of the 2,6-naphthalenedicarboxylic acid component is more than 20 mol %, strong fusion occurs upon solid-phase polymerization, thereby making it difficult to introduce stable solid-phase polymerization conditions. Therefore, the molar ratio (%) of the terephthalic acid component to the 2,6-naphthalenedicarboxylic acid component as acid components is within the range of (80 to 95)/(20 to 5), preferably (85 to 95)/(15 to 5).

The copolyester of the present invention may be a copolymer of which part is substituted with an acid component or a glycol component other than terephthalic acid, 2,6-naphthalenedicarboxylic acid and ethylene glycol within a range not exceeding 10 mol % or less of the total of the whole acid component. Illustrative examples of the acid component include aliphatic dicarboxylic acids such as oxalic acid, malonic acid, succinic acid, adipic acid, sebacic acid and dodecanedicarboxylic acid; aromatic dicarboxylic acids such as terephthalic acid, isophthalic acid, 4,4'-diphenyldicarboxylic acid, diphenoxyethane-4,4'-dicarboxylic acid, diphenylsulfone-4,4'-dicarboxylic acid and diphenylether-4,4'-dicarboxylic acid; alicyclic dicarboxylic acids such as hexahydroterephthalic acid, decalindicarboxylic acid and tetralindicarboxylic acid; oxyacids such as glycol acid and p-oxybenzoic acid; and the like. Illustrative examples of the glycol component include aliphatic diols such as tetramethylene glycol, propylene glycol, 1,3-butanediol and neopentyl glycol; alicyclic diols such as cyclohexane dimethanol and tricyclodecane dimethylol; aromatic diols such as bisphenol A, bisphenol S, bishydroxyethoxybisphenol A and tetrabromobisphenol A; and the like.

The copolyester of the present invention may also include those copolymerized with a polycarboxylic acid having a 3 or more functional groups or polyhydroxy compound such as trimellitic acid and pentaerythritol in such an amount that it is substantially linear, for example, in an amount of 2 mol % or less of the total of the whole acid component.

According to studies conducted by the present inventors, it has been found that the copolyester of the present invention can be obtained through an ester interchange reaction, melt polymerization reaction and solid-phase polymerization reaction as will be described hereinafter.

That is, according to the present invention, there is provided a method of producing the copolyester composition of the present invention, which comprises preparing a copolyester comprising 80 to 95 mol % of dimethyl terephthalate and 20 to 5 mol % of dimethyl-2,6-naphthalene dicarboxylate as acid components and ethylene glycol as a glycol component through an ester interchange reaction and a polymerization reaction, wherein the ester interchange reaction is carried out in the presence of a catalyst comprising a calcium compound, magnesium compound and cobalt compound and the polymerization reaction is carried out in a molten state and then in a solid-phase state.

The calcium (Ca) compound and magnesium (Mg) compound used as an ester interchange (EI) reaction catalyst in the present invention are oxides, chloride, carbonates, carboxylates or mixtures thereof, and preferably are used as carboxylates. To suppress the formation of deposited particles due to the catalysts, calcium acetate and magnesium acetate which have relatively high compatibility with a polymer are preferably used.

When a cobalt (Co) compound is used in combination as an ester interchange reaction catalyst, the cobalt compounds are used as oxides, chlorides, carbonates or carboxylates. Cobalt carboxylates are preferred and cobalt acetate is particularly preferred.

In the present invention, the above ester interchange reaction catalysts are used in such amounts that satisfy the above expressions (1) to (4). Ca, Mg and Co in these expressions represent each an amount (mmol %), in terms of metal, of the calcium compound, magnesium compound and cobalt compound.

As shown in the expression (1), Ca is used in the range of $0.1 < Ca \leq 35$, preferably $1 \leq Ca < 30$. As shown in the expression (2), Mg is used in the range of $0.1 < Mg \leq 80$, preferably $1 \leq Mg \leq 70$.

The calcium compound and the magnesium compound are used in combination and the total amount thereof is in the range of $40 \leq (Ca+Mg) \leq 90$, preferably $50 \leq (Ca+Mg) \leq 80$.

When the total amount of Ca and Mg is less than 40 mmol % of the total of the whole acid component, the EI reaction activity is low and the EI reaction time must be made extremely long with the result of inconvenience in production.

Conversely, when the total amount of Ca and Mg is more than 90 mmol % of the total of the whole acid component, the polymer is whitened when it is blow molded into a bottle because the deposited products are large in quantity and become crystal nuclei.

In the present invention, a calcium (Ca) catalyst and a magnesium (Mg) catalyst are used in combination. Although in the case of the copolyester of the present invention, it is preferable to use a calcium (Ca) catalyst as the EI catalyst in order to maintain an excellent hue, the calcium (Ca) catalyst is the most unpreferred from a viewpoint of suppressing whitening at the time of molding a bottle. In other words, the improvement of hue and the suppression of whitening conflict with each other. In the present invention, the improvement of hue and the suppression of whitening are made possible by adding together a calcium catalyst and a magnesium catalyst each in specified amounts.

The addition of both the calcium catalyst and the magnesium catalyst has also a synergistic effect on EI activity. The highest EI activity is obtained when the molar ratio of the calcium catalyst and the magnesium catalyst is within a range of from (40:60) to (20:80) at a temperature of 180° to 240° C. In the present invention, the EI reaction is completed by adding the calcium catalyst and magnesium catalyst in such amounts as to improve hue, suppress whitening and increase EI activity efficiently. Stated more specifically, they are added in such amounts that satisfy the expressions (1), (2) and (3).

A manganese (Mn) catalyst and a titanium (Ti) catalyst are known as catalysts which produce a relatively small amount of deposited particles in the production of a polyester. However, the manganese (Mn) catalyst has poor compatibility with a germanium (Ge) polymerization catalyst which is used as a polymerization catalyst in the copolyester of the present invention, reduces viscosity and produces deteriorated by-products such as acetoaldehyde and formaldehyde at the time of molding, thereby emitting an offensive odor. Therefore, it is unsuitable for use as a material for a container. Meanwhile, a polymer produced using a titanium (Ti) catalyst has a strong yellow tint and is therefore unsuitable for use as a material for a container. In this case, as a method for obtaining a polymer which is not so strongly tinged with yellow, a method in which a prepolymer having a low inherent viscosity is first obtained and then, a polymer having a high inherent viscosity of target is produced by the solid-phase polymerization of the prepolymer can be generally employed. Since the copolymer of the present invention has a low melting point and needs to be reacted at a relatively low solid-phase polymerization temperature, the above method is not preferred from a view point of production. The reason for this is that the inherent viscosity must be increased to 0.70 to 0.95 to change the prepolymer which has an inherent viscosity of 0.4 to 0.5 and is not so strongly tinged with yellow into a polymer for use as a material for a container. For this purpose, the solid-phase polymerization time must be made extremely long, which is not realistic from a view point of production.

A cobalt (Co) catalyst is known as an EI catalyst capable of suppressing yellowing. However, when a cobalt catalyst is solely used, crystallization occurs and the container (bottle) has whitening when a polymer is blow molded into a container (bottle) because the catalyst particle is large in size and works as a crystal nucleus. As shown in the expression (4), the cobalt (Co) catalyst is used in an amount of 15 mmol % or less in the present invention. Within this range, the catalyst exhibits an effective function as an EI catalyst and moreover, a function to suppress yellowing which is the cause of deterioration in hue. When the amount of the cobalt (Co) catalyst added is more than 15 mmol % of the total of the whole acid component, the hue becomes gray. Thus, the hue of the container deteriorates. The amount of the cobalt (Co) catalyst is preferably 1 to 10 mmol %.

In the present invention, a phosphorus compound is preferably added in order to deactivate the activities of the EI catalysts. The amount (molar ratio) of the phosphorus compound is within the range of from 0.8 to 1.5 (the expression (5)), preferably 1.1 to 1.3, based on 1 mmol % based on the total of the whole acid component, i.e., based on the total amount of the cobalt compound used as a cobalt catalyst, the calcium compound used as a calcium catalyst and the magnesium compound used as a magnesium catalyst. When the amount (molar ratio) of the phosphorus compound is less than 0.8, the EI exchange catalysts are not deactivated completely and the obtained polymer has poor heat stability, with the consequence that the polymer is colored or experiences reductions in physical properties at the time of molding. Conversely, when the amount of the phosphorous compound is more than 1.5, heat stability lowers disadvantageously.

Illustrative examples of the phosphorus compound include orthophosphoric acid, trimethyl phosphate, monomethyl phosphate, dimethyl phosphate and triphenyl phosphate. The preferred phosphorus compound is a compound represented by the following general formula

in which $R^1$, $R^2$ and $R^3$ are independently a hydrogen atom, $-CH_3$, $-C_2H_5$, $-CH_2CH_2OH$ or $-C_6H_5$. Of these, orthophosphoric acid and trimethyl phosphate are preferred because they are easily obtained and inexpensive. When an alkyl group and organic group substituting the phosphorus atoms of a phosphoric acid compound is a bulky substituent, the deposited particle becomes large in size. To suppress whitening, the deposited particle is preferably small in size. The ester interchange (EI) reaction is carried out using dimethyl terephthalate and dimethyl-2,6-naphthalene dicarboxylate as acid components in the above-specified amounts and ethylene glycol as a glycol component in the presence of the above ester interchange catalysts. The ethylene glycol is used within the range of 1.6 to 2.4 moils, preferably 1.8 to 2.2 moils, per 1 mol of the acid components. The EI reaction is generally carried out at a temperature of 270° to 305° C. The reaction time varies depending on the devices and raw materials for EI reaction and can be set appropriately. The reaction conditions and means for the EI reaction are basically the same as known conditions and means for the production of polyethylene terephthalate.

High-purity 2,6-naphthalenedicarboxylic acid suitable for use as a material for a container (bottle) is not mass-produced currently. To obtain a high-quality polyester, dimethyl terephthalate and dimethyl-2,6-naphthalene dicarboxylate must be used as starting materials, and it is inevitable that an EI method is used to polymerize these to obtain a polyester and EI catalysts must be used.

The reaction mixture obtained by the EI reaction is subsequently subjected to the polymerization reaction. As a polymerization catalyst used for the polymerization is preferably germanium dioxide from a viewpoint of hue. Amorphous germanium dioxide having no crystal form is particularly preferred. When this amorphous germanium dioxide is used as a polymerization catalyst, the number of deposited particles in the polymer is smaller and a more transparent polymer is obtained, compared with those obtained when germanium dioxide having an ordinary crystal form is used.

The term "amorphous germanium dioxide" refers to germanium dioxide showing substantially no peak in the Raman spectrum. When the amount of the amorphous germanium dioxide added is too small, polymerization reactivity lowers with the result of a reduction in productivity. On the contrary, when the amount is too large, heat stability deteriorates with the result of reductions in physical properties and deterioration in hue at the time of molding. Therefore, the amount of germanium metal is generally 15 to 50 mmol % (expression (6)), preferably 20 to 40 mmol % based on the total of the whole acid component of the polymer.

To further suppress the deposition of particles caused by the ester interchange catalysts or to finely disperse the deposited particles in the production of the copolyester of the present invention, an ammonium compound represented by the following formula [II] is preferably further contained.

in which $R^4$, $R^5$, $R^6$ and $R^7$ are independently a hydrogen atom, alkyl group having 1 to 5 carbon atoms, cycloalkyl group having 3 to 6 carbon atoms, aryl group having 6 to 12 carbon atoms or substituent derivative of these, provided that $R^4$ and $R^5$ may form a ring and $R^4$, $R^5$, $R^6$ and $R^7$ may be the same or different, and A is an anion residue.

Illustrative examples of the ammonium compound include quaternary ammonium salts such as hydroxytetramethyl ammonium, hydroxytetraethyl ammonium, hydroxytetrabutyl ammonium and tetraethyl ammonium chloride; tertiary ammonium salts such as hydroxytrimethyl ammonium; secondary ammonium salts such as hydroxydimethyl ammonium; primary ammonium salts such as hydroxymethyl ammonium; and ammonium salts such as hydroxy ammonium and ammonium chloride. The above ammonium compounds may be used alone or in combination of two or more. The anion A in the above formula is preferably OH or halogen (such as Cl or Br).

The amount of this ammonium compound is 0.04 to 0.4 mol, preferably 0.07 to 0.2 mol, based on $10^6$ g of the whole acid component of the polymer. Below 0.04 mol, effect brought about by the ammonium compound on suppressing the deposition of catalyst particles and finely dispersing the deposited particles is small and transparency is not improved. Above 0.4 mol, its effect is not improved any longer and polymerization reactivity deteriorates conversely.

It is preferable that the ammonium compound and the phosphorus compound are added after the EI reaction is substantially completed and before the inherent viscosity reaches 0.2 dl/g. The order of addition of the ammonium compound is not limited particularly and may be added in an arbitrary order.

As for timings of the addition of the germanium compound and the phosphorus compound, they are preferably added before the inherent viscosity reaches 0.3 dl/g. The atmosphere of the reaction system at the time of addition may be under reduced pressure after a polymerization reaction is started. A melt polymerization reaction is carried out at a temperature of 270° to 305° C. and a high vacuum of 0.1 to 2.0 Torr. The reaction time varies depending on the devices and raw materials for the reaction and can be set appropriately, while it is generally about 1 to 10 hours.

The polymer, as a prepolymer, obtained by the above melt polymerization reaction is then subjected to a solid-phase polymerization so as to obtain a copolyester for a container having an inherent viscosity of 0.7 to 0.95 dl/g. The inherent viscosity of the prepolymer to be polymerized in a solid-phase state is preferably 0.45 to 0.67 dl/g from viewpoints of production efficiency and quality.

The solid-phase polymerization is carried out at a temperature of 190° to 225° C. in a reduced nitrogen gas atmosphere or in a nitrogen gas-circulating atmosphere (in a pressurized nitrogen gas atmosphere) after the copolyester obtained by the melt polymerization is made into chips. The size of a chip is preferably within a range of 1.0 to 5.0 mm in terms of equivalent diameter. Here, the "equivalent diameter" denotes a diameter of a sphere of which the volume is assumed to be equivalent to the volume of the chip.

When it is intended to obtain the inherent viscosity allowing the polymer to use for a container (bottle) by increasing its inherent viscosity only by melt polymerization, the polymer of the present invention is strongly colored and a burden on a polymerization device becomes large. Further, when the inherent viscosity is increased only by melt polymerization, aldehydes are by-produced in large quantities in the polymer.

The copolyester obtained by the present invention can be molded into a container, particularly a bottle, by known molding means per se. For example, the copolyester is molten and formed into a preform which is then blow molded into a bottle.

EXAMPLES

The following examples are given to further illustrate the present invention. "Parts" in examples means parts by weight. The values of characteristic properties given in the examples were measured in accordance with the following methods.

(1) inherent viscosity [η]:

This was calculated from the viscosity of a solution measured at 35° C. using a phenol/tetrachloroethane (component weight ratio: 3/2) solvent.

(2) hue A:

After the polymer was heated at 160° C. in a drier for 90 minutes and crystallized, the hue of the polymer was measured by a Model CM-7500 color machine of Color Machine Co., Ltd. to obtain values L and b.

(3) haze:

The polymer was dried at 160° C. for 7 hours and molded into a preform having a weight of 50 g using the DYNAMELTER M-100DM injection molding machine of Meiki Seisakusho Co., Ltd. at a cylinder temperature of 300° C. The preform was blow molded into a bottle having an internal volume of 1.5 liters and a barrel thickness of 0.2 mm. A middle barrel portion of this bottle was cut out and measured for its haze by a haze meter (Model 1001DP of Nippon Denshoku Kogyo K.K.).

(4) looseness in mouth portion of bottle when filled with hot water (resistance to hot water):

The bottle obtained in (3) above was filled with a hot water of 85° C., its cap was fastened firmly, and then, the bottle was placed horizontally. After 10 minutes, it was lifted up and looseness of the cap was checked. In the Table 2, evaluation is indicated as "No" when looseness in fastening of the cap was not observed, while it is indicated as "Yes" when looseness. in fastening of the cap was observed. In this test, the bottle was subjected to the test without it being crystallized at the mouth portion. That is, the mouth portion of the bottle in the test was not white but transparent.

(5) deposited particles:

The copolyester compositions obtained in Examples and Comparative Examples were molten at 285° C. in a nitrogen gas stream, and one end of a glass tube was inserted into the molten products and drawn up. Air was blown from the other end of the glass tube before the molten products were solidified to form stretched films. Each of the stretched films was cut into a sample piece which was then photographed at a magnification of 600× by an optical microscope. The number of deposited particles having a equivalent diameter of 0.5 μm or more and being present in a 7 cm×9 cm section of this magnified photo was counted visually.

The evaluation was made based on the following criteria.
◯: 250 or less deposited particles
Δ: 251 to 349 deposited particles
X: 350 or more deposited particles (6) hue B:

The middle barrel portion of the bottle obtained in (3) above was cut out, molten, crystallized (at 140° C. for 1 hour), and measured for its values L and b by a Model CM-7500 color machine of Color Machine Co., Ltd. The hue of the bottle was evaluated based on the difference between the values (value L - value b) as follows.
◯: 77 or more
Δ: 70 to 76
X: 69 or less (7) analysis for determining amounts of formaldehyde and acetoaldehyde The middle barrel portion of the bottle obtained in (3) above was cooled with liquid nitrogen and pulverized to prepare a polymer sample of 20 mesh or less. 3.0 ml of water was added to 1.0 g of the polymer sample and heated at 120° C. for 1 hour to extract the polymer. To this aqueous solution of the extract was added 2,4-DNPH (dinitrophenylhydrazine) to further extract formaldehyde and acetoaldehyde in $CCl_4$ as stable organic salts. The $CCl_4$ was analyzed by gas chromatography and the amounts of formaldehyde and acetoaldehyde contained in the copolyester of the bottle were calculated from the amounts of the detected salts.

Example 1

10 Parts of dimethyl-2,6-naphthalene. dicarboxylate (QE), 90 parts of dimethyl terephthalate (DMT) and 63 parts of ethylene glycol (EG) were reacted with one another in a reaction system heated by a Dowtherm, using 0.0038 part of cobalt acetate tetrahydrate (3 mmol % of the total of the whole acid component), 0.0133 part of calcium acetate monohydrate (15 mmol % of the total of the whole acid component) and 0.0649 part of magnesium acetate tetrahydrate (60 mmol % of the total of the whole acid component) as EI catalysts to complete an EI reaction. As for the temperature condition of the Dowtherm, the temperature was elevated from 140° C. to 230° C. over 150 minutes and maintained at 230° C. for 30 minutes. After 1.59 parts of a 1% ethylene glycol solution of amorphous germanium dioxide (30 mmol % of the total of the whole acid component) was added, 0.0743 parts of trimethyl phosphate (90 mmol % of the total of the whole acid component) was further added, and then a polycondensation reaction was carried out at 285° C. under a high vacuum by a commonly used method. Thereafter, the polycondensation product ([η]=0.62) was extracted under a large quantity of running water by a commonly used method and formed into a strand chip by a pelletizer. The chips were polymerized in a solid-phase state at 205° C. in an $N_2$ atmosphere having a pressure of 0.5 mmHg to increase the inherent viscosity of the polymer to 0.82.

Examples 2 and 3 and Comparative Examples 1 to 10

Polymers were obtained in the same manner as in Example 1 except that the cobalt acetate tetrahydrate, manganese acetate tetrahydrate, magnesium acetate tetrahydrate, calcium acetate hydrate and phosphoric acid compound were changed as shown in Table 1. The qualities and evaluation results of the obtained polymers are shown in Table 1 and Table 2.

When stretched films were formed from the polymers obtained in Examples 1 and Comparative Example 1, the numbers of deposited particles were found to be 158 and 372, respectively.

TABLE 1

| | Polymer composition | Catalyst | | | | | | | |
|---|---|---|---|---|---|---|---|---|---|
| | QE/DMT (molar ratio) | $Co(OAc)_2$ mmol % | $Ca(OAc)_2$ mmol % | $Mg(OAc)_2$ mmol % | $Mn(OAc)_2$ mmol % | P mmol % | $GeO_2$ mmol % | Ca + Mg | P/(Ca + Mg + Co) |
| Ex. 1 | 8/92 | 3 | 15 | 60 | — | 90 | 30 | 75 | 1.15 |
| Ex. 2 | 8/92 | 3 | 25 | 45 | — | 90 | 30 | 70 | 1.23 |
| Ex. 3 | 8/92 | 3 | 15 | 60 | — | 96 | 40 | 75 | 1.15 |
| Comp. Ex. 1 | 8/92 | 3 | 75 | — | — | 90 | 30 | 75 | 1.15 |
| Comp. Ex. 2 | 8/92 | 3 | — | 75 | — | 90 | 30 | 75 | 1.15 |
| Comp Ex. 3 | 8/92 | 3 | — | 120 | — | 150 | 30 | 120 | 1.17 |
| Comp. Ex. 4 | 8/92 | 3 | — | — | 50 | 60 | 30 | 0 | P/(Co + Mn)1.13 |
| Comp. Ex. 5 | 8/92 | 3 | 15 | 60 | — | 90 | 10 | 75 | 1.15 |
| Comp. Ex. 6 | 8/92 | 3 | 15 | 60 | — | 90 | 60 | 75 | 1.15 |
| Comp. Ex. 7 | 8/92 | 3 | 15 | 60 | — | 55 | 30 | 75 | 0.71 |
| Comp. Ex. 8 | 8/92 | 3 | 15 | 60 | — | 130 | 30 | 75 | 1.67 |
| Comp. Ex. 9 | 0/100 | 3 | 15 | 60 | — | 90 | 30 | 75 | 1.15 |
| Comp. Ex. 10 | 25/75 | 3 | 15 | 60 | — | 90 | 30 | 75 | 1.15 |

Ex.: Example, Comp. Ex.: Comparative Example P: trimethyl phosphate QE: dimethyl-2,6-naphthalene dicarboxylate

TABLE 2

| | Prepolymer Polymerization time (min) | Prepolymer [η] (dl/g) | Polymer after solid-phase polymerization [η] (dl/g) | Polymer after solid-phase polymerization Hue A (L/b) | Quality of bottle Looseness in mouth portion when filled with hot water | Quality of bottle Deposited particles | Quality of bottle Bottle haze | Quality of bottle Hue B | Quality of bottle FA/AA (ppm) |
|---|---|---|---|---|---|---|---|---|---|
| Ex. 1 | 138 | 0.62 | 0.82 | 80/2.1 | No | ○ | 1.4 | ○ | 1.7/7.8 |
| Ex. 2 | 140 | 0.62 | 0.82 | 81/1.8 | No | ○ | 1.5 | ○ | 1.5/7.9 |
| Ex. 3 | 143 | 0.62 | 0.82 | 80/2.5 | No | ○ | 1.3 | ○ | 1.9/7.5 |
| Comp. Ex. 1 | 184.5 | 0.62 | 0.82 | 82/2.0 | No | x | 4.5 | ○ | 1.8/7.4 |
| Comp. Ex. 2 | 207 | 0.62 | 0.82 | 80/1.5 | No | Δ | 1.8 | ○ | 2.0/7.8 |
| Comp. Ex. 3 | 140 | 0.62 | 0.82 | 79/3.0 | No | x | 3.1 | Δ | 2.0/8.2 |
| Comp. Ex. 4 | 135 | 0.62 | 0.82 | 81/2.7 | No | ○ | 1.0 | ○ | 3.5/14.4 |
| Comp. Ex. 5 | 265 | 0.55 | See Note *1) | — | — | — | — | — | — |
| Comp. Ex. 6 | 106 | 0.62 | 0.82 | 78/3.9 | No | Δ | 1.2 | Δ | 3.6/17.9 |
| Comp. Ex. 7 | 127 | 0.62 | 0.82 | 73/4.6 | No | ○ | 1.5 | x | 4.2/23.5 |
| Comp. Ex. 8 | 168 | 0.62 | 0.82 | 74/4.8 | No | ○ | 1.5 | x | 5.7/26.5 |
| Comp. Ex. 9 | 125 | 0.62 | 0.82 | | Yes | x | 3.3 | ○ | 1.3/6.5 |
| Comp. Ex. 10 | 185 | 0.62 | See Note *2) | — | — | — | — | — | — |

Ex.: Example Comp. Ex.: Comparative Example

Note: FA : formaldehyde, AA : acetoaldehyde
*1) stands for a phrase "no further improvement in polymerization degree of prepolymern"
*2) stands for a phrase "solid-phase polymerization impossible due to severe blocking"

As is evident from these results, a reduction in polymerization activity due to low EI reactivity is remarkable and the productivity is low when calcium acetate or magnesium acetate is solely added (Comparative Examples 1 and 2). The polymer of Comparative Example 1 is not preferred because a large number of deposited particles are produced by calcium acetate, and the haze value is unsatisfactory. When the amount of magnesium acetate added is increased to improve EI reactivity as in Comparative Example 2, number of deposited particles grows and the haze of the resulting bottle greatly deteriorates (Comparative Example 3).

When manganese acetate is used as an EI catalyst, the heat resistance of the resulting polymer is unsatisfactory and large quantities of formaldehyde and acetoaldehyde by-produced by heat deterioration at the time of molding are contained in the molded bottle and give out an offensive odor. Therefore, the molded bottle is not suitable as a drinking bottle (Comparative Example 4).

When the amount of amorphous germanium dioxide as a polymerization catalyst is too small, it takes too long to increase inherent viscosity to a value suitable for the molding of a bottle. On the other hand, when the amount is too large, heat resistance lowers with the result of deterioration in hue and an increase in the amounts of formaldehyde and acetoaldehyde (Comparative Examples 5 and 6).

When the amount of trimethyl phosphate added as a phosphorus compound is too small or too large, heat resistance lowers and the resulting container becomes yellowish (Comparative Examples 7 and 8).

When the proportion of the 2,6-naphthalene-dicarboxylic acid component is reduced, the hot water resistance of the mouth portion of the bottle lowers, and the ultraviolet light screening and gas barrier properties thereof cannot be improved. When the amount of the naphthalene dicarboxylic acid component is small, the quality of the resulting bottle lowers to the level of PET (Comparative Example 9). When the proportion of the 2,6-naphthalenedicarboxylic acid component is made excessive, handling becomes extremely difficult at the time of solid-phase polymerization and hence, stable production is impossible (Comparative Example 10).

The ultraviolet light screening and gas barrier properties of copolyesters obtained in Example 1 and Comparative Example 9 were studied. The barrel portions of the bottles obtained for the measurement of haze in (3) above were cut out and measured for their ultraviolet light screening and gas barrier properties. The results are as follows. Sheets having a thickness of 30 pm obtained by stretching the obtained samples to 3 times in both longitudinal and transverse directions were measured for their $CO_2$ gas transmission coefficients.

| | Example 1 | Comparative Example 9 |
|---|---|---|
| ultraviolet light screening property (wavelength of $\lambda_{T=0}$) | 369 nm | 310 nm |
| gas barrier property ($CO_2$ gas transmission coefficient: $cc \cdot cm/cm^2 \cdot sec \cdot mmHg$) | $0.9 \times 10^{-11}$ | $1.1 \times 10^{-11}$ |

A container formed from the copolyester composition of the present invention is excellent in gas barrier property, ultraviolet light screening property, hot water resistance, hue and transparency, is not whitened, has a small content of aldehyde, is of great product value and can be provided economically advantageously.

What is claimed is:

1. A container formed from a copolyester composition which comprises a copolyester containing 80 to 95 mol % of terephthalic acid and 20 to 5 mol % of 2,6-naphthalenedicarboxylic acid as acid components and ethylene glycol as a glycol component, wherein catalyst metal components are contained in the copolyester in such amounts that satisfy the following expressions (1) to (4) based on the total of the whole acid component:

$$0.1 < Ca \leq 35 \quad (1)$$
$$0.1 < Mg \leq 80 \quad (2)$$
$$40 \leq (Ca+Mg) \leq 90 \quad (3)$$
$$0 \leq Co \leq 15 \quad (4)$$

in which Ca, Mg and Co represent each an amount (mmol %), in terms of metal, of a calcium compound, magnesium compound and cobalt compound contained in the copolyester, based on the total of the whole acid component.

2. The container of claim 1, wherein the copolyester composition further contains a phosphorus compound in such an amount that satisfies the following expression (5):

$$0.8 \leq P/(Ca+Mg+Co) \leq 1.5 \quad (5)$$

in which Ca, Mg and Co are the same as defined above and P represents an amount (mmol %), in terms of phosphorus, of the phosphorus compound contained in the copolyester based on the total of the whole acid component.

3. The container of claim 1, wherein the copolyester composition further contains a germanium compound in such an amount that satisfies the following expression (6):

$$15 \leq Ge \leq 50 \quad (6)$$

in which Ge represents an amount (mmol %), in terms of germanium metal, of the germanium compound contained in the copolyester based on the total of the whole acid component.

4. The container of claim 2, wherein the copolyester composition is produced by adding a phosphorus compound represented by the following general formula [I]:

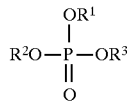

[I]

in which $R^1$, $R^2$ and $R^3$ are independently a hydrogen atom, $-CH_3$, $-C_2H_5$, $-CH_2CH_2OH$ or $-C_6H_5$.

5. The container of claim 1, wherein the copolyester has an inherent viscosity of 0.70 to 0.95 dl/g.

6. The container of claim 1, wherein the copolyester composition has a formaldehyde content of 2 ppm or less and an acetoaldehyde content of 8 ppm or less.

7. The container of claim 1, wherein the copolyester comprises 85 to 95 mol % of terephthalic acid and 15 to 5 mol % of 2,6-naphthalenedicarboxylic acid as acid components and ethylene glycol as a glycol component.

8. The container of claim 1, wherein the copolyester composition contains a calcium compound, a magnesium compound and a cobalt compound in such amounts that satisfy the following expressions (1') to (4'):

$$1 \leq Ca \leq 30 \quad (1')$$
$$1 \leq Mg \leq 70 \quad (2')$$
$$50 \leq (Ca+Mg) \leq 80 \quad (3')$$
$$0 \leq Co \leq 15 \quad (4')$$

in which Ca, Mg and Co are the same as defined above.

9. The container of claim 1, wherein the copolyester composition further contains a phosphorus compound in such an amount that satisfies the following expression (5'):

$$1.1 \leq P/(Ca+Mg+Co) \leq 1.3 \quad (5')$$

in which Ca, Mg, Co and P are the same as defined above.

10. The container of claim 1 which is formed from the copolyester composition recited in claim 1 by a blow molding.

11. A composition for producing a container formed from the copolyester composition recited in claim 1.

12. A method of producing the copolyester composition recited in claim 1 comprising preparing a copolyester comprising 80 to 95 mol % of dimethyl terephthalate and 20 to 5 mol % of dimethyl-2,6-naphthalene dicarboxylate as acid components and ethylene glycol as a glycol component through an ester interchange reaction and a polymerization reaction, wherein the ester interchange reaction is carried out in the presence of a catalyst comprising a calcium compound, a magnesium compound and a cobalt compound and the polymerization reaction is carried out in a molten state and then in a solid-phase state.

13. The production method of claim 12, wherein the polymerization reaction is carried out in the presence of a phosphorus compound.

14. The production method of claim 13, wherein the polymerization reaction is carried out in the presence of an amorphous germanium compound.

15. The production method of claim 13, wherein the polymerization reaction is carried out in a molten state to obtain a copolyester having an inherent viscosity of 0.45 to 0.67 dl/g and then in a solid-phase state to obtain a copolyester having an inherent viscosity of 0.70 to 0.95 dl/g.

* * * * *